United States Patent [19]

Tally

[11] Patent Number: 4,597,425
[45] Date of Patent: Jul. 1, 1986

[54] COLLAPSIBLE LIQUID STORAGE TANK

[76] Inventor: David N. Tally, 8991 W. Layton, Littleton, Colo. 80123

[21] Appl. No.: 664,123

[22] Filed: Oct. 23, 1984

[51] Int. Cl.$^4$ .................. B65D 37/00; B65D 85/72
[52] U.S. Cl. ...................... 150/55; 220/900; 222/107; 222/572; 383/904; 383/906
[58] Field of Search ............. 150/55; 206/521; 220/414, 900, 453; 222/92, 105, 107, 572, 573; 138/132, 155; 383/116, 908, 113, 904, 906; 141/114

[56] References Cited

U.S. PATENT DOCUMENTS

| 2,209,570 | 7/1940 | Kraft | 383/116 |
| 2,451,911 | 10/1948 | Braden | 220/900 X |
| 2,612,924 | 10/1952 | Cunningham | 383/908 X |
| 2,615,487 | 10/1952 | Cunningham | 220/453 X |
| 2,724,418 | 11/1955 | Krupp | 150/55 |
| 2,744,043 | 5/1956 | Ramberg | 220/414 X |
| 2,848,133 | 8/1958 | Ramberg | 220/414 X |
| 2,851,075 | 9/1958 | Palfey | 150/55 |
| 2,854,048 | 9/1958 | Cunningham | 150/55 |
| 2,865,419 | 12/1958 | Cunningham | 383/908 X |
| 2,969,102 | 1/1961 | Cunningham | 150/55 |
| 3,123,254 | 3/1964 | Rabby et al. | 220/465 X |
| 3,178,050 | 4/1965 | Doerpinghaus | 150/55 X |
| 3,282,361 | 11/1966 | Mackie | 150/55 X |
| 3,334,676 | 8/1967 | Girard | 150/55 |
| 3,400,741 | 9/1968 | Robinson et al. | 150/55 |
| 3,921,674 | 11/1975 | Logan et al. | 138/132 X |
| 3,982,573 | 9/1976 | Jones | 150/55 |
| 4,468,812 | 8/1984 | Grosvenor | 383/113 X |
| 4,522,235 | 6/1985 | Kluss et al. | 138/132 X |

FOREIGN PATENT DOCUMENTS 119303  10/1918  United Kingdom ................. 150/55

Primary Examiner—William Price
Assistant Examiner—Sue A. Weaver
Attorney, Agent, or Firm—H. W. Oberg, Jr.; C. H. Castleman, Jr.; Frank P. Grassler

[57] ABSTRACT

A liquid storage tank of the collapsible type that has an elongate body with a liner and cover that sandwich a twined reinforcement. The body has an intermediate tubular portion with a reinforcement arranged to allow radial growth. Two opposite end portions are interconnected by the tubular body and are reinforced with twined cords that generally radially enforce such end portions. An outlet is provided in one of the end portions.

10 Claims, 5 Drawing Figures

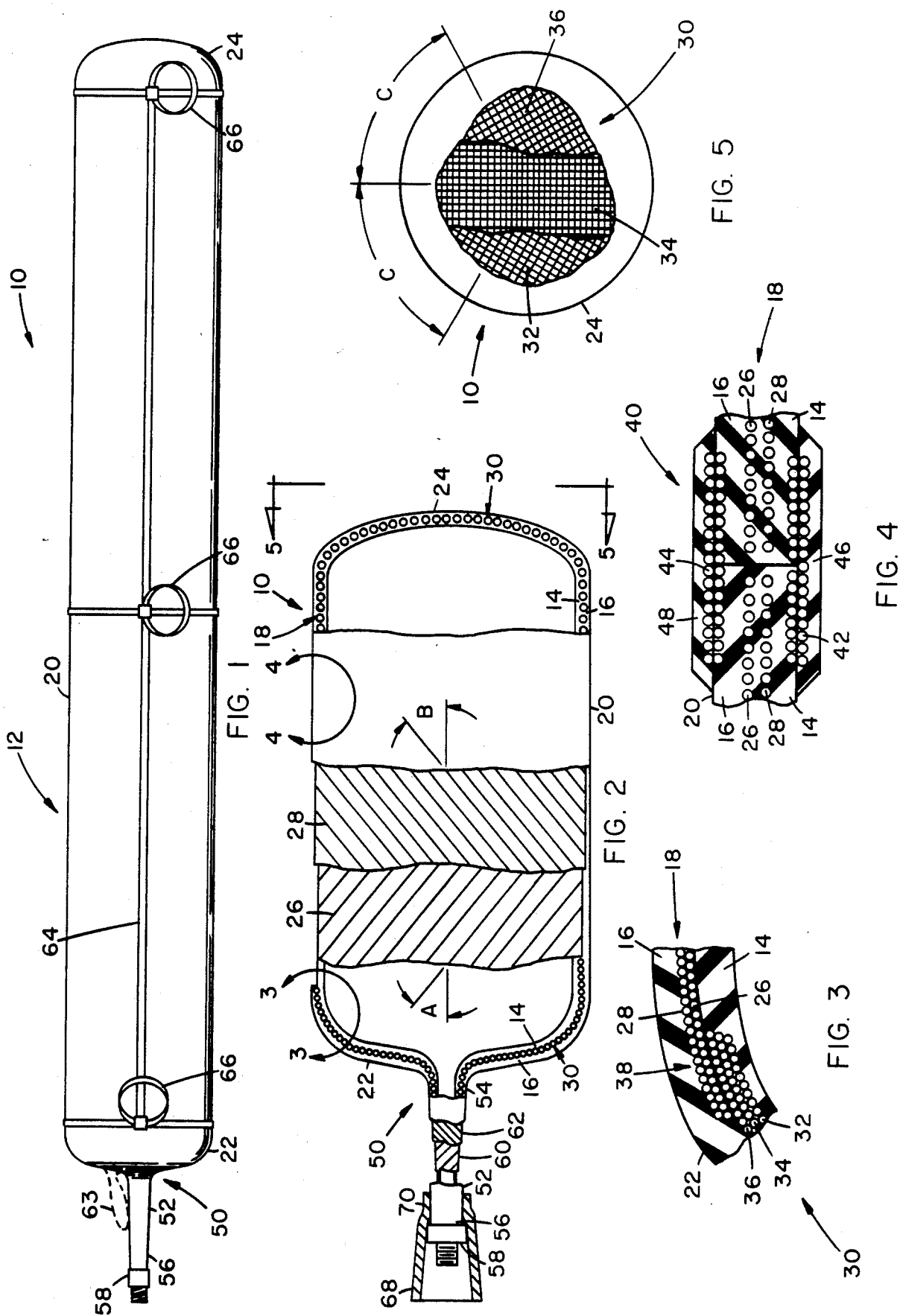

COLLAPSIBLE LIQUID STORAGE TANK

BACKGROUND OF THE INVENTION

The invention relates to a liquid storage tank of the collapsible type, but more particularly, the invention relates to a storage tank construction that permits it to be dropped from vehicles and run over by vehicles without the likelihood of incurring significant damage.

Several types of storage tanks are available for storage of liquids such as water, fuel, or chemicals. Some storage tanks retain their shape while liquid is being dispensed therefrom while other storage tanks collapse while liquid is dispensed therefrom. This invention is directed to storage tanks of the collapsible type.

Liquid may be dispensed from a collapsible storage tank by means of pumping, a liquid head, or by forcibly collapsing the storage tank such as by rolling over it with a vehicle. An example of a collapsible storage tank that is intended to be run over by a vehicle appears in U.S. patent application Ser. No. 480,934 by Curiel. While Curiel discloses an easy method for dispensing a liquid from a collapsible tank, he discloses a tank that is cumbersome because of its excessive weight and shape; a tank that is difficult to manufacture because of its several irregular shapes; and a tank that is susceptible to damage when dropped from or rolled over by a vehicle. Self-inflicted damage is likely to occur because of the location of the valve outlet.

SUMMARY OF THE INVENTION

In accordance with the invention, a light weight, collapsible storage tank is provided with a construction that inhibits self-inflicted damage when the tank is used such as when dropped from a vehicle or when run over by a vehicle when dispensing liquid.

The storage tank has a generally thin-walled body that includes a tubular portion that integrally interconnects two opposite ends. The body is constructed with an elastomeric liner and cover that sandwich a twined reinforcement. The reinforcement in the tubular portion has twined cords extending at opposite helical angles to allow growth of the tubular portion when pressurized. Each end portion has a reinforcement with twined cords that are oriented to generally radially reinforce each end portion. At outlet is provided in one end portion which, in a preferred embodiment, is in the form of a hose-like nozzle to which is attached a fitting such as a hose coupling.

An object of the invention is to provide a light weight, collapsible storage tank having a construction that inhibits self-inflicted damage when the tank is dropped from a vehicle or when run over by a vehicle during liquid dispensing.

This and other objects or advantages of the invention will be more apparent after reviewing the drawings and description thereof wherein:

FIG. 1 is a front view of a storage tank of the invention;

FIG. 2 is a partially cutaway and cross-sectional view similar to that of FIG. 1 but of a shortened storage tank of the invention;

FIG. 3 is an enlarged partial view taken along the line 3—3 of FIG. 2; and

FIG. 4 is an enlarged but cross-sectional partial view taken along the line 4—4 of FIG. 2.

FIG. 5 is a partially cutaway but full end view taken along the line 5—5 of FIG. 2;

DESCRIPTION OF PREFERRED EMBODIMENTS

Referring to the Figures, a light weight, thin-walled storage tank 10 of the collapsible type is provided. The Figures depict a storage tank in a pressurized condition as when filled with gas or liquid. Normally, the storage tank is in a somewhat collapsed condition when not in use due to its thin-walled construction.

The storage tank has a generally thin-walled, elongate body 12 that is made with an elastomeric liner 14 and cover 16 that sandwich a twined reinforcement 18. The liner and cover are made from elastomeric materials that are suitable for an intended environment. The elastomeric materials may be chosen from natural or synthetic rubber or blends thereof. As is known, the rubber may be compounded to be compatible with liquids such as potable water, petroleum, or chemicals such as acids or bases, or it may be compounded to be abrasion resistant.

The body has an intermediate tubular portion 20 that integrally interconnects two opposite end portions 22, 24. The reinforcement that is located in the tubular portion is made with cord 26, 28 that is generally spiralled at opposite helical angles A, B that may range from about 43 degrees to about 53 degrees. More preferably, the cord is disposed at opposite helical angles of substantially 50 degrees. As used herein, the term "cord" may be in the form of textile threads, plied textile yarns, twisted metal wire, tire cord fabric or the like. The cords may be twined such as by spiralling or braiding, or they may be twined as sheet fabric that is spiralled. In any case, the cords in the tubular portion are applied so that they allow a radial growth of a tubular portion when it is pressurized.

Each end portion 22, 24 may have a curvilinear shape such as spherical or ellipsoidal. The reinforcement 30 disposed in each end portion has twined cords that are oriented to generally radially reinforce such end portions. Examples of a radial type reinforcement is in the form of three types of square woven fabric 32, 34, 36 or tire cord fabric where each successive layer is rotated some angle C, as for example approximately 60 degrees, in relation to an adjacent layer as illustrated by FIG. 5.

FIG. 3 illustrates how the reinforcement of the tubular portion and the end portion may overlap each other. Preferably, a reinforcement overlap seam 38 that interconnects the tubular portion and end portions are free of any flap extending type lap seams such as those of a pillow. This is because flap extending lap seams tend to pull the reinforcement apart when the tank is pressurized whereas the overlap seam 38 tends to tension the reinforcement.

The length of the tubular portion may be varied to control the volume of the storage tank. A butt-type circumferential seam with overlapping reinforcement 40 may be used in the tubular portion such as is illustrated in FIG. 4. Inner and outer reinforcements 42, 44 tension the reinforcement 26, 28 in such a manner that the overlap seam does not tend to peel apart. The liner and cover may extend 46, 48 to embed the lap reinforcements.

An outlet 50 is located in one end portion and, in a preferred embodiment, is in the form of a reinforced, elastomeric hose-like nozzle 52 that has a first end 54 integrally interconnected to such end portion 22. A second end 56 is attached to a fitting 58 such as a compression type hose coupling having a stem and a ferrule. The hose-like nozzle may be reinforced with layers of oppositely spiralled cord 60, 62 that such as in a manner similar to the overlap seam as illustrated in FIG. 4 that interconnects the tubular portion and end portion. The nozzle type outlet has a length that is at least 2 times greater than a maximum length of the fitting, and more preferably, the hose-type nozzle has a length that is greater than a radius of the tubular portion. The nozzle positions the fitting away from the storage tank so that it is not likely to inflict damage to the tank when it is dropped from a vehicle or run over by a vehicle. The nozzle positions the fitting away from the end portion so that it cannot inflict damage to the end portion when it is flattened 63 as illustrated by dotted lines in FIG. 1.

Optionally, a harness 64 made of webbing may be used to facilitate handling. The harness may include several loop type handles 66.

EXAMPLE I

A storage tank of the invention is constructed as follows:
Outside diameter—13.25 inches (33.7 cm)
Length—108 inches (274 cm)
Liner thickness—0.125 inches (6.35 mm)
Cover thickness—0.125 inches (1.57 mm)
Nozzle length—10 inches (25.4 cm)
Fitting length—4 in. (10.2 cm)
Nozzle internal diameter—1.5 inches (3.8 cm)
Material, liner—Nitrile rubber
Material, cover—Nitrile rubber
Tubular reinforcement—0.017 in. (0.43 mm) polyester cord×2
End portion reinforcement—0.035 in. fabric (0.89 mm)×3
Tank capacity—55 gallons (208 liters)
Empty weight—70 lbs (32 Kg)

To illustrate the effectiveness of the invention, the exemplary storage tank was filled with water and pressurized to about 10 psi. The tank was then dropped 50 feet (15.2 mm) without rupturing to simulate being dropped from a vehicle such as a helicopter or truck. The radially expansible tubular portion gives the body a compliance that inhibits rupturing when dropped. Diesel fuel was dispensed from the storage tank by running over it with a vehicle in the manner as described in U.S. patent application Ser. No. 480,934. Pressure in the tank rose to 50 psi. as fluid was dispensed. The fitting, being 10 in. from its end portion, did not inflict any damage to the tank when the end portion was flattened against the nozzle by the vehicle.

ADDITIONAL SPECIES

While the distal location of the fitting relative to the storage tank inhibits self-inflicted leak type damage when the tank is collapsed as by running over it with a vehicle, there is a possibility that some damage may be inflicted to the fitting. For example, pipe type threads may be crushed making it difficult to connect or disconnect the fitting. A protective sheath 68 of elastomeric material may optionally be used as a means to protect the fitting and inhibit damage thereto. The sheath has one end 70 that attaches to the nozzle.

The foregoing detailed description is only made for illustration purposes and it is not intended to limit the scope of the invention which is to be determined from the appended claims.

What is claimed is:
1. In a liquid storage tank of the collapsible type with a generally thin-walled, elongate body having an elastomeric liner and cover that sandwich a twined reinforcement, the body having an intermediate tubular portion integrally interconnecting two opposite end portions in which one has an outlet, the improvement comprising:
   the reinforcement in the tubular portion comprising twined cords extending at opposite helical angles that allow a radial growth of the tubular portion when pressurized, the reinforcement in each end portion comprising twined cords that are oriented to generally radially reinforce such end portion; and
   a reinforced elastomer hose-like nozzle having a first end integrally connected to the outlet and a second end connected to a fitting, the nozzle having a sufficient length to position the fitting away from the body when the body is flattened and wherein the nozzle has a reinforcement that interconnects with the reinforcement of the connected end portion.
2. The liquid storage tank as claimed in claim 1 wherein the twined cords in the tubular portions extend at opposite helical angles from about 43 to about 53 degrees.
3. The liquid storage tank as claimed in claim 1 wherein the twined cords in the tubular portions extend at opposite helical angles of substantially 50 degrees.
4. The liquid storage tank as claimed in claim 1 wherein the fitting is a compression type hose fitting.
5. The liquid storage tank as claimed in claim 1 wherein the nozzle has a length that is at least two times greater than a maximum length of the fitting.
6. The liquid storage tank as claimed in claim 1 wherein the tubular portion of the body has an overlap seam.
7. The liquid storage tank as claimed in claim 1 wherein the reinforcement in each end portion comprises three layers of fabric where each successive layer is rotated approximately 60 degrees in relation to an adjacent layer.
8. A liquid storage tank of the collapsible type comprising:
   a generally thin-walled, elongated body having an elastomeric liner and cover that sandwich a textile reinforcement, the body having an intermediate tubular portion interconnecting two opposite end portions, the reinforcement in the tubular portion comprising twined cords extending at opposite helical angles from about 43 degrees to about 53 degrees, the reinforcement in each end portion comprising twined cords that are oriented to generally radially reinforce such end portion; and
   an outlet located in one end portion and comprising an elastomeric hose-like nozzle with an embedded twined reinforcement and having a first end integrally interconnected to such end portion and a second end attached to a fitting, the nozzle having a sufficient length to position the fitting away from the body when the body is flattened.
9. In a liquid storage tank of the collapsible type with an elongate body having an intermediate tubular portion integrally interconnecting two opposite end portions and an outlet in one of the end portions interconnecting a fitting, the improvement comprising:
   a reinforced elastomer hose-like nozzle having a first end integrally interconnected to the outlet and a second end connected top the fitting, the nozzle having a sufficient length to position the fitting away from the body when the body is flattened and wherein a reinforcement of the hose interconnects with the reinforcement of the end portion.

10. The liquid storage tank as claimed in claim 9 wherein a protective sheath of elastomer is disposed around the fitting.

* * * * *